United States Patent
Iwasaki

(10) Patent No.: US 7,416,212 B2
(45) Date of Patent: Aug. 26, 2008

(54) ABSORPTION STRUCTURE OF A CONTAINER DEVICE FOR AN INSTRUMENT PANEL FOR ABSORBING ENERGY APPLIED FROM KNEES OF AN OCCUPANT

(75) Inventor: Hideki Iwasaki, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 297 days.

(21) Appl. No.: 11/387,069

(22) Filed: Mar. 23, 2006

(65) Prior Publication Data

US 2006/0226645 A1 Oct. 12, 2006

(30) Foreign Application Priority Data

Mar. 25, 2005 (JP) ............... 2005-088272
Mar. 25, 2005 (JP) ............... 2005-088273

(51) Int. Cl.
*B60R 21/045* (2006.01)
(52) U.S. Cl. .............. 280/752; 280/751; 296/37.12
(58) Field of Classification Search ........... 280/751, 280/752, 730.1; 296/37.12
See application file for complete search history.

(56) References Cited

U.S. PATENT DOCUMENTS

| | | | |
|---|---|---|---|
| 6,706,365 B2 * | 3/2004 | Akasaka et al. ........... | 428/156 |
| 6,786,524 B2 * | 9/2004 | Tamura .................. | 296/37.12 |
| 7,201,434 B1 * | 4/2007 | Michalak et al. ......... | 296/187.05 |
| 7,311,327 B2 * | 12/2007 | Yamazaki ............... | 280/752 |
| 2006/0038390 A1 * | 2/2006 | Cho .................... | 280/752 |
| 2007/0182145 A1 * | 8/2007 | Penner ................. | 280/752 |

FOREIGN PATENT DOCUMENTS

JP 2001-301531 A 10/2001

* cited by examiner

*Primary Examiner*—Kevin Hurley
*Assistant Examiner*—Drew J. Brown
(74) *Attorney, Agent, or Firm*—Foley & Lardner LLP

(57) ABSTRACT

An absorption structure for absorbing energy applied from knees of an occupant includes: an energy absorbing knee protector provided substantially along a back surface of a lid outer member of a lid portion; a clearance concave portion formed on a region of the energy absorbing knee protector corresponding to a location of a side-locking mechanism, which is provided in the lid outer member and has a rod portion and a locking mechanism, substantially in a vehicle width direction and detouring the side-locking mechanism; an auxiliary knee protector provided substantially along the back surface of the lid outer member in a region within the clearance concave portion corresponding to the rod portion; and a small concave portion formed on the auxiliary knee protector substantially in the vehicle width direction and detouring the rod portion.

20 Claims, 10 Drawing Sheets

ABSORPTION STRUCTURE OF A CONTAINER DEVICE FOR AN INSTRUMENT PANEL FOR ABSORBING ENERGY APPLIED FROM KNEES OF AN OCCUPANT

CROSS-REFERENCE TO RELATED APPLICATIONS

The present application is based on and claims priority benefit from Japanese Patent Application No. 2005-088272, filed Mar. 25, 2005 and Japanese Patent Application No. 2005-088273, filed Mar. 25, 2005, the disclosures of those are hereby incorporated by reference herein in their entirety.

BACKGROUND

The present invention relates to an absorption structure of a container device provided in an instrument panel, for absorbing energy or force applied from knees of an occupant.

Generally in a vehicle such as an automobile, an instrument panel is provided at front of a vehicle interior. As shown in FIG. 1, the instrument panel 101 is provided with a container device 102 for the instrument panel 101 such as a glove box. The container device 102 includes a container device body 103, and a lid portion (lid body) 105 attached openably and closeably to an opening of the container device body 103. The lid portion 105 is normally structured by a lid outer member 106 and a lid inner member 107 (for reference, see JP2001-301531A).

Recently, it has been considered and studied to arrange an energy absorbing knee protector 108 to a region of the lid portion 105 in the container body 102 to which knees of an occupant approach, in order to protect the occupant's knees in a case of an emergency.

Such an energy absorbing knee protector 108 is structured by a plurality of steel plates 109, 110 and 111 for receiving energy (or force) applied from the knees of the occupant (hereinafter referred to as knee input energy), a steel bar-like member 112 fixed to upper and lower edges of the steel plates 109, 110 and 111 for increased strength and rigidity, and so on for example. The energy absorbing knee protector 108 is, for example, disposed substantially along a back surface of the lid outer member 106.

When the knees of the occupant approach the lid portion 105 in the emergency, the energy absorbing knee protector 108 provided substantially along the back surface of the lid outer member 106 receives the knee input energy and thereafter, deforms to optimally absorb the knee input energy. Thereby, the knees of the occupant are protected from damage.

However, in recent years, a side-locking mechanism as a locking device of the lid portion 105 has been increasingly employed in the container device 102 for the instrument panel 101 such as the glove box, which has advantage in expansion of storage capacity of the container device 102 as compared with an ordinary center-locking mechanism. The side-locking mechanism has rod portions which extend toward each side of the vehicle in a vehicle-width direction from a locking mechanism portion. In other words, the side-locking mechanism is provided throughout the entire area in the container device 102 relative to the lid portion 105 in the vehicle-width direction.

Therefore, in the conventional energy absorption structure of the container device 102 for the instrument panel 101 for absorbing the knee input energy, there has been a problem that the side-locking mechanism is disposed highly likely in the region of the lid portion 105 to which the knees of the occupant approach, and thus causing difficulty in designing of the energy absorbing knee protector as well as in mounting of the energy absorbing knee protector 108 and the side-locking mechanism, in a case where the side-locking mechanism is employed.

In addition, the steel bar-like member 112 of the energy absorbing knee protector 108 fixed to the upper and lower edges of the steel plates 109, 110 and 111 for increased strength and rigidity incurs increase in weight. Therefore, there has been also a problem that an operation feeling is worsened due to increased opening speed of the lid portion 105 and increased force required to close the lid portion 105 by the increased weight.

SUMMARY

Therefore, the present invention has been made in view of the above circumstances, and at least one objective of the present invention is to provide an absorption structure of a container device for an instrument panel capable of effectively absorbing knee input energy applied from knees of an occupant even when a side-locking mechanism is employed for a locking device of a lid portion of the container device, without incurring increase in weight.

To achieve these and other advantages and in accordance with the purpose of the invention, as embodied and broadly described herein, the invention provides an absorption structure for absorbing energy applied from knees of an occupant, comprising: a container provided in an instrument panel and having an opening; a lid attached to the opening of the container and having a lid outer member and a lid inner member; a side-locking mechanism provided on the lid outer member and having a locking member and a locking mechanism, the locking member extending from the locking mechanism toward at least one side of a vehicle substantially in a direction of width of the vehicle, and the locking mechanism is configured to enter a leading edge of the locking member into at least one side of the lid and to move the leading edge of the locking member out of the at least one side of the lid; a first knee protector provided substantially along a back surface of the lid outer member; a first concave portion formed on a region of the first knee protector corresponding to a location of the side-locking mechanism substantially in the vehicle width direction and detouring the side-locking mechanism; a second knee protector provided substantially along the back surface of the lid outer member in a region within the first concave portion corresponding to the locking member; and a second concave portion formed on the second knee protector substantially in the vehicle width direction and detouring the locking member.

Following are preferred embodiments (1) to (6) of the absorption structure for absorbing the energy applied from the knees of the occupant according to the present invention. Any combinations thereof are considered to be preferred ones of the present invention unless any contradictions occur.

(1) The locking member is detachably fitable to the locking mechanism by pushing the locking member into the locking mechanism in a direction of extension of the locking member.

(2) The first knee protector includes a plurality of beads each extending substantially in the vehicle-width direction and having a substantially rectangular cross-section of a predetermined depth and width size.

(3) A bottom surface of the second concave portion substantially contacts with a bottom surface of the first concave portion.

(4) The first knee protector is mounted on the back surface of the lid outer member by fixing upper and lower edges of the first knee protector to the back surface of the lid outer member with a screw or by welding.

(5) The first knee protector includes a notch in a region corresponding to the at least one side of the lid so as to avoid interference of the first knee protector with the at least one side of the lid.

(6) The side-locking mechanism is disposed in a region of a knee-contacting part on the lid outer member where knees of an adult occupant having an average physique are most likely to contact to the region of the knee-contacting part, directly.

In addition, the invention provides another absorption structure for absorbing energy applied from knees of an occupant, comprising: a container provided in an instrument panel and having an opening; a lid attached to the opening of the container and having a lid outer member and a lid inner member; a side-locking mechanism provided on the lid outer member and having a locking member and a locking mechanism, the locking member extending from the locking mechanism toward at least one side of a vehicle substantially in a direction of width of the vehicle, and the locking mechanism is configured to enter a leading edge of the locking member into at least one side of the lid and to move the leading edge of the locking member out of the at least one side of the lid; a first knee protector provided substantially along a back surface of the lid outer member; and a first concave portion mounted on a region of the first knee protector corresponding to a location of the side-locking mechanism substantially in the vehicle width direction and surrounding the side-locking mechanism, wherein the locking member is detachably fitable to the locking mechanism by pushing the locking member into the locking mechanism in a direction of extension of the locking member.

Following are preferred embodiments (1) to (5) of the absorption structure for absorbing the energy applied from the knees of the occupant according to the present invention. Any combinations thereof are considered to be preferred ones of the present invention unless any contradictions occur.

(1) The first knee protector includes a plurality of beads each extending substantially in the vehicle-width direction and having a substantially rectangular cross-section of a predetermined depth and width size.

(2) The absorption structure further comprises a second knee protector provided substantially along the back surface of the lid outer member in a region within the first concave portion corresponding to the locking member; and a second concave portion formed on the second knee protector substantially in the vehicle width direction and detouring the locking member, wherein a bottom surface of the second concave portion substantially contacts with a bottom surface of the first concave portion.

(3) The first knee protector is mounted on the back surface of the lid outer member by fixing upper and lower edges of the first knee protector to the back surface of the lid outer member with a screw or by welding.

(4) The first knee protector includes a notch in a region corresponding to the at least one side of the lid so as to avoid interference of the first knee protector with the at least one side of the lid.

(5) The side-locking mechanism is disposed in a region of a knee-contacting part on the lid outer member where knees of an adult occupant having an average physique are most likely to contact to the region of the knee-contacting part, directly.

Furthermore, the invention provides yet another absorption structure for absorbing energy applied from knees of an occupant, comprising: a container provided in an instrument panel and having an opening; a lid attached to the opening of the container and having a lid outer member and a lid inner member; a side-locking mechanism provided on the lid outer member and having a locking member and a locking mechanism, the locking member extending from the locking mechanism toward at least one side of a vehicle substantially in a direction of width of the vehicle, and the locking mechanism is configured to enter a leading edge of the locking member into at least one side of the lid and to move the leading edge of the locking member out of the at least one side of the lid; a first knee protector provided substantially along a back surface of the lid outer member; a first concave portion mounted on a region of the first knee protector corresponding to a location of the side-locking mechanism substantially in the vehicle width direction and surrounding the side-locking mechanism, the first knee protector and the first concave portion are discrete member; a second knee protector provided substantially along the back surface of the lid outer member in a region within the first concave portion corresponding to the locking member; and a second concave portion formed on the second knee protector substantially in the vehicle width direction and detouring the locking member.

Following are preferred embodiments (1) to (6) of the absorption structure for absorbing the energy applied from the knees of the occupant according to the present invention. Any combinations thereof are considered to be preferred ones of the present invention unless any contradictions occur.

(1) The locking member is detachably fitable to the locking mechanism by pushing the locking member into the locking mechanism in a direction of extension of the locking member.

(2) The first knee protector includes a plurality of beads each extending substantially in the vehicle-width direction and having a substantially rectangular cross-section of a predetermined depth and width size.

(3) A bottom surface of the second concave portion substantially contacts with a bottom surface of the first concave portion.

(4) The first knee protector is mounted on the back surface of the lid outer member by fixing upper and lower edges of the first knee protector to the back surface of the lid outer member with a screw or by welding.

(5) The first knee protector includes a notch in a region corresponding to the at least one side of the lid so as to avoid interference of the first knee protector with the at least one side of the lid.

(6) The side-locking mechanism is disposed in a region of a knee-contacting part on the lid outer member where knees of an adult occupant having an average physique are most likely to contact to the region of the knee-contacting part, directly.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
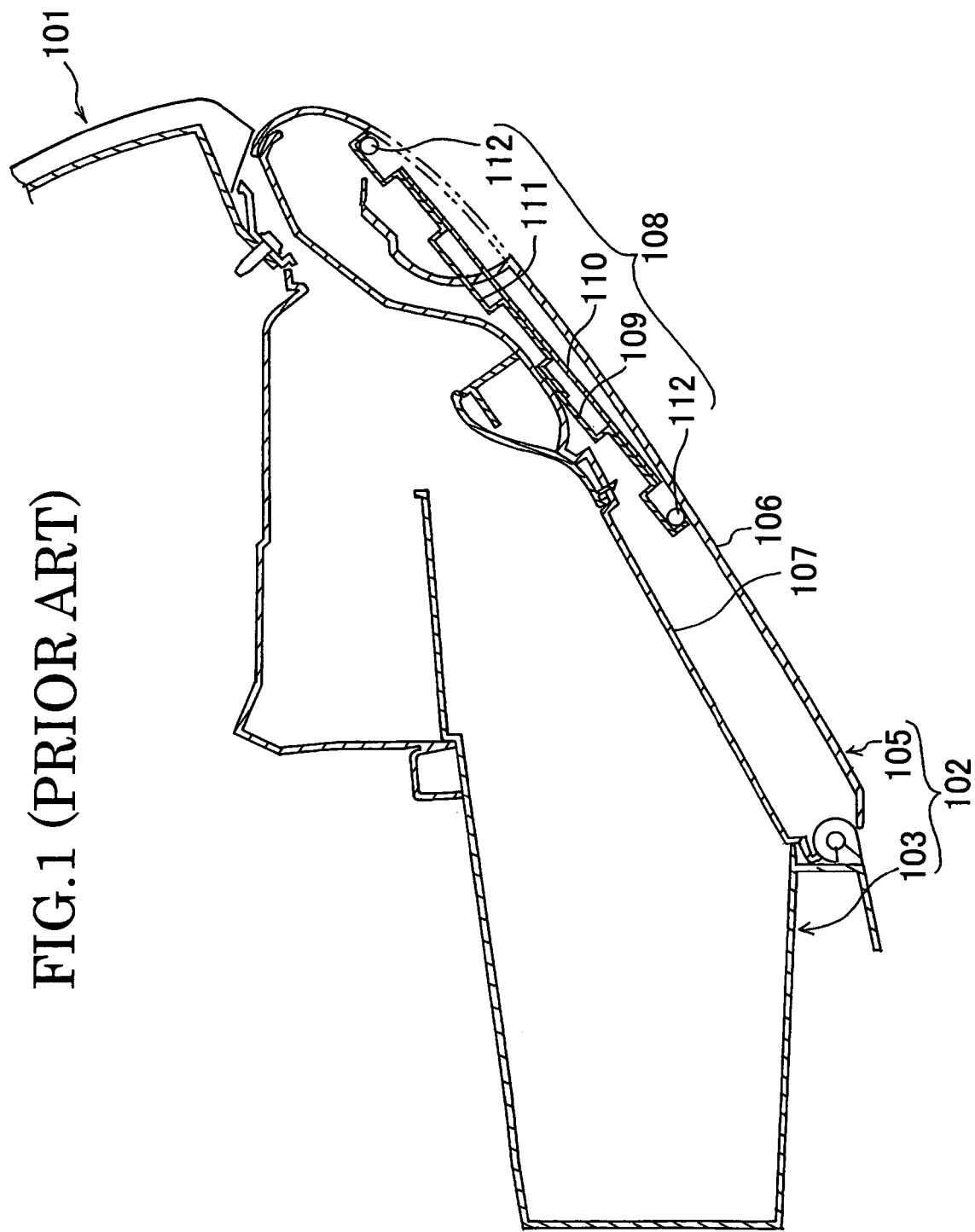
FIG. 1 is a sectional side view showing a conventional knee input energy absorption structure.

Reference will now be made in detail to the present preferred embodiments of the invention, examples of which are illustrated in the accompanying drawings. Wherever possible, the same reference numbers are used in the drawings and the description to refer to the same or like parts of the above-described conventional examples. The scope of the present invention, however, is not limited to these embodiments. Within the scope of the present invention, any structure and material described below can be appropriately modified.

FIGS. 2 to 10 show a knee input energy absorption structure according to an embodiment of the present invention.

Figure 2:
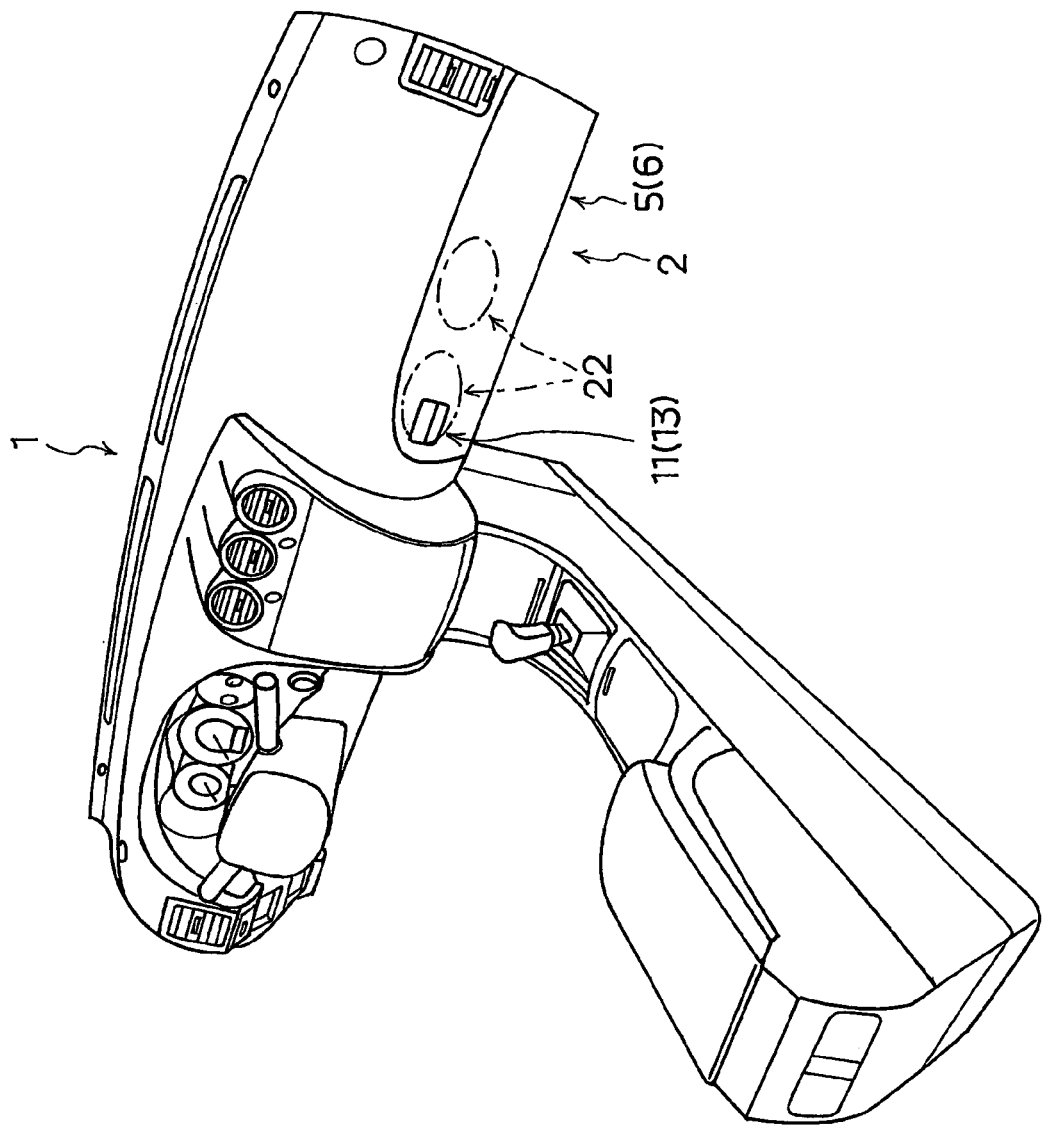
FIG. 2 is a perspective view schematically showing an instrument panel arranged in a vehicle interior having a knee input energy absorption structure according to an embodiment of the present invention.

Referring to FIG. 2, a front part of a vehicle interior of a vehicle such as an automobile is provided with an instrument panel 1. The instrument panel 1 includes a container device 2 for the instrument panel 1 such as a glove box.

The container device 2 is disposed on a side of the instrument panel 1 which faces a front passenger seat in the present embodiment. In one embodiment, the container device 2 is arranged on a side of the instrument panel 1 which faces a driver seat.

Figure 3:
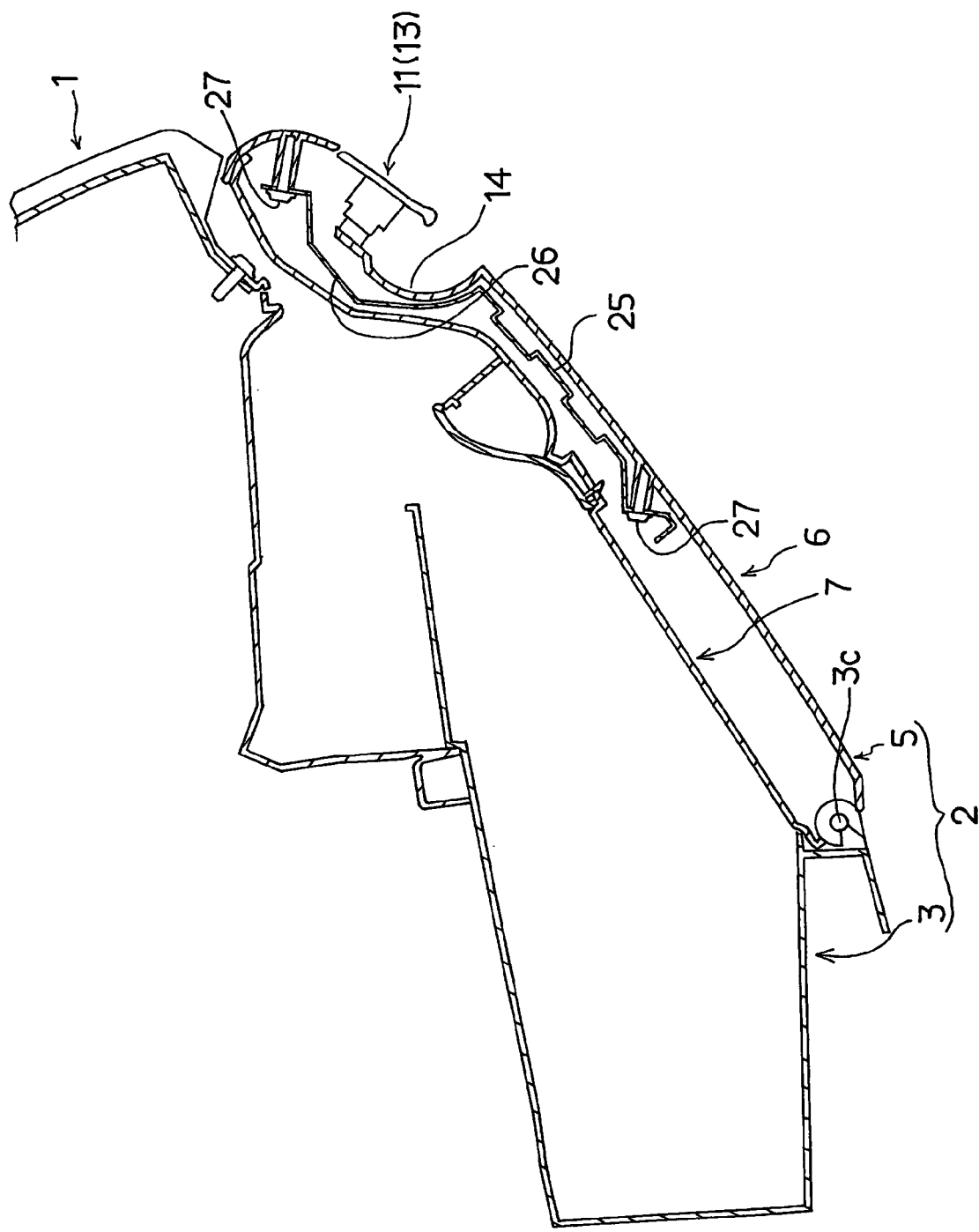
FIG. 3 is a vertical sectional view showing a lid portion shown in FIG. 2.

As shown in FIG. 3, the container device 2 includes a container device body 3, and a lid portion (lid body) 5 attached openably and closeably to an opening of the container device body 3.

Figure 4:
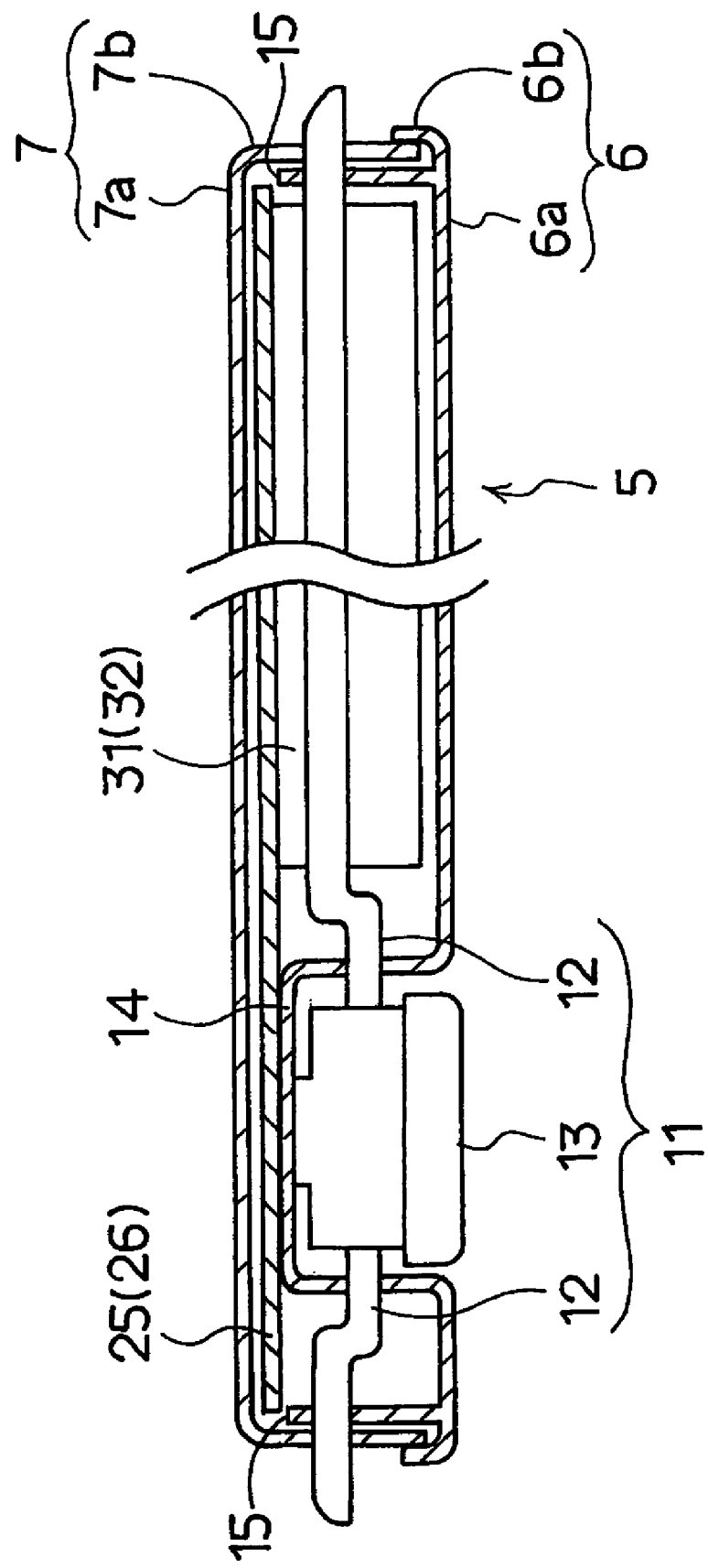
FIG. 4 is a sectional side view showing the lid portion of FIG. 2.

Referring to FIG. 4, the lid portion 5 includes a lid outer member 6 and a lid inner member 7. The lid outer member 6 structures an external design of the lid portion 5, and preferably comprises a resin molding although the present embodiment is not limited thereto. The lid inner member 7 structures an internal design of the lid portion 5 for backing and reinforcing the lid outer member 6, which also preferably comprises a resin molding although it is not limited thereto.

The lid outer member 6 and the lid inner member 7 are formed to have substantially uniform thickness on the whole, and have outer peripheral flange portions 6b and 7b coupled with corresponding surface portion 6a and 7a, respectively.

Where appropriate, a reinforcement rib, a boss or the like may be arranged on the lid outer member 6 and the lid inner member 7.

Figure 5:
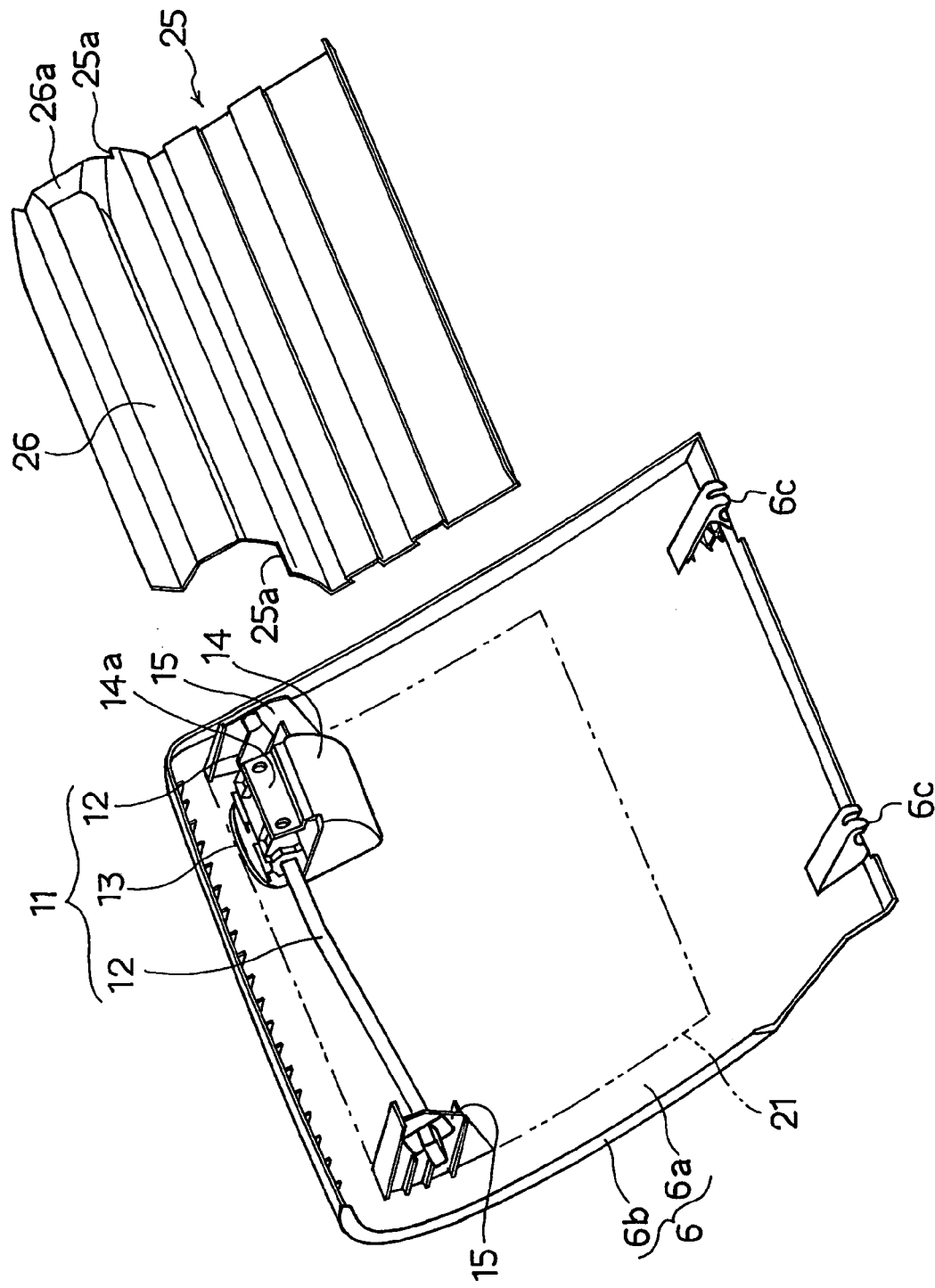
FIG. 5 is a perspective view showing a lid outer member before an energy absorbing knee protector is mounted thereto, seen from a back surface of the lid outer member.

Referring to FIG. 5, the lid outer member 6 is provided with a hinge shaft receiving portion 6c on each end of a lower edge of a back surface of the lid outer member 6. On the other hand, the container device body 3 is provided with a hinge shaft portion 3c on each end of a lower edge of the opening of the container device body 3 as shown in FIG. 3. The hinge shaft receiving portion 6c is rotatably engaged with the hinge shaft portion 3c, and thereby the lid portion 5 opens downwardly and closes upwardly around the lower edge of the container device body 3.

The lid portion 5 includes a side-locking mechanism 11 which has advantage in expansion of storage capacity of the container device 2 as compared with an ordinary center-locking mechanism. The side-locking mechanism 11 has a pair of right and left rod portions (locking members) 12 extending toward each side of the vehicle substantially in a vehicle-width direction, and a locking mechanism portion 13 for allowing a leading edge of each of the rod portions 12 to enter into and move out or move away from both sides of the lid portion 5. In one embodiment, the rod portion 12 extends from the locking mechanism portion 13 toward one side of the vehicle substantially in the vehicle width direction, and the locking mechanism portion 13 enters the leading edge of the rod portion 12 into the one side of the lid portion 5 and moves the leading edge of the rod portion 12 out of or away from the one side of the lid portion 5.

The leading edge of each of the rod portions 12 is formed with a claw portion 52, and a claw receiving portion which is not shown is provided on both sides of the container device body 3. The claw portion 52 and the claw receiving portion collaborate to lock and unlock the lid portion 5. The locking mechanism portion 13 includes an operating lever portion manipulated by hands of an occupant, and a drive mechanism portion which operates by the manipulation of the operating lever portion.

Figure 8:
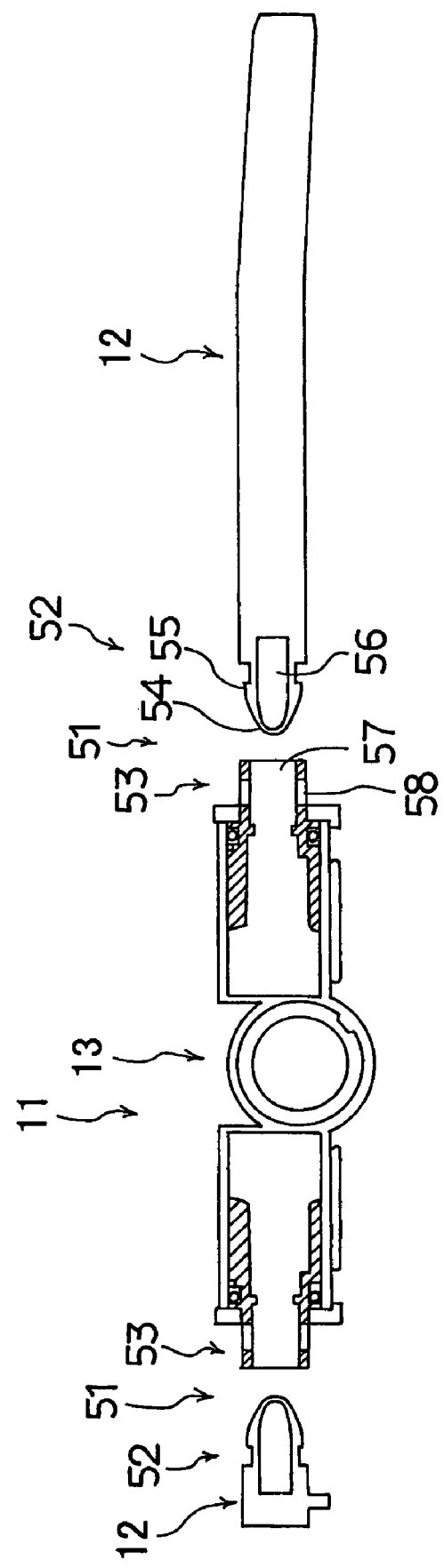
FIG. 8 is an exploded view showing a locking mechanism portion provided with a fitting portion.
Figure 9:
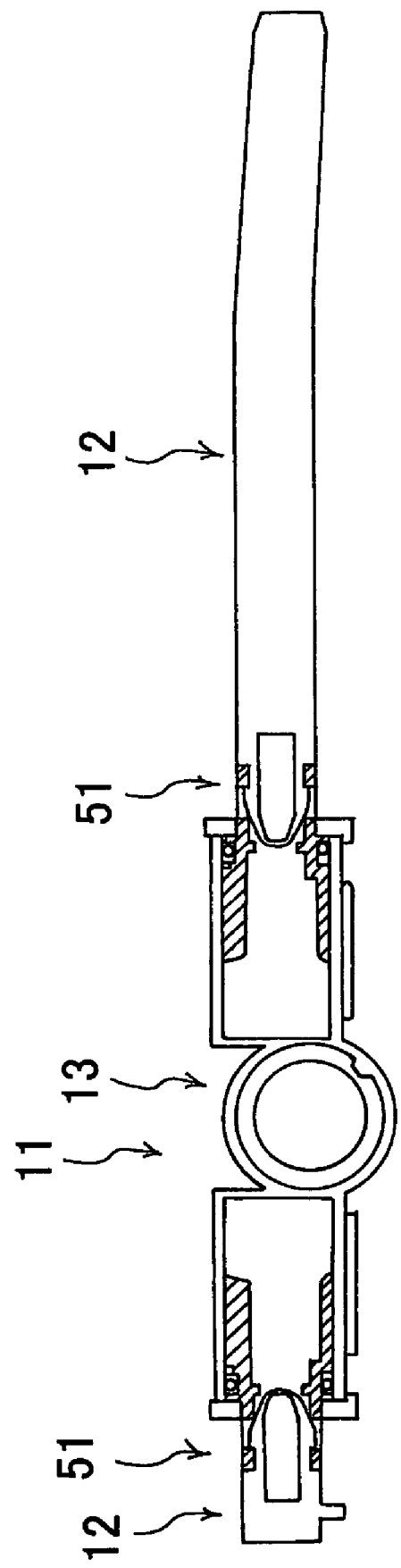
FIG. 9 is a view showing an assembled state of the locking mechanism portion and rod portions.

More specifically, as shown in FIGS. 8 and 9, the side-locking mechanism 11 is structured to be capable of separating each of the rod portions 12 from the locking mechanism portion 13 and coupling the rod portions 12 with the locking mechanism portion 13 through an one-touch (single action) fitting portion 51 (detachable fitable structure). In the present embodiment, the fitting portion 51 is structured by the claw portion 52 provided on the rod portion 12, and a claw receiving portion 53 provided in the locking mechanism portion 13.

The leading edge of the claw portion 52 includes a tapered guide portion 54 and an engaging portion 55, and is also formed with a cavity portion 56 for easier deformation of the claw portion 52. The claw receiving portion 53 includes a fitting hole 57 for fitting and connecting the leading edge of the claw portion 52, and a receiving hole 58 for receiving the engaging portion 55.

The side-locking mechanism 11 is mounted near an upper edge of the back surface of the lid outer member 6 as shown in FIG. 5 in the present embodiment. The side-locking mechanism 11 may be provided at the part of the back surface of the lid outer member 6 other than the upper edge of the back surface thereof, depending upon a design of the instrument panel 1 or the vehicle. In one embodiment, the side-locking mechanism 11 is provided in the middle part of the back surface of the lid outer member 6, or near the lower edge of the back surface of the lid outer member 6.

The back surface side of the lid outer member 6 also includes a locking mechanism portion mounting concave portion 14 for installing the locking mechanism portion 13, and a rod retaining portion 15 for retaining the leading edge or a part near the leading edge of the rod portion 12 with an inserted state of the rod portion 12.

The mounting concave portion 14 is partially protruded from the surface portion 6a toward the back surface in a concave-like shape and has substantially uniform thickness similar to that of the surface portion 6a of the lid outer member 6. The mounting concave portion 14 includes a pair of side surface portions each formed substantially in a fan-like shape, and a curved inner (bottom) surface portion which connects between each of the side surface portions. The mounting concave portion 14 is formed with an opening on an upper part thereof for communicating internal and external of the mounting concave portion 14. An attaching member 14a for mounting the locking mechanism portion 13 is provided in such a manner as to protrude from an inner (bottom) surface portion of the opening of the mounting concave portion 14 substantially toward above, and the locking mechanism portion 13 is attached to the attaching member 14a with a screw, welding or other suitable means. The rod retaining portion 15 has a vertical rib configuration which faces substantially in upper and lower directions.

In the present embodiment, the mounting concave portion 14 is provided closer to a side of the driver seat in order that the occupant in the driver seat can manipulate the operating lever portion of the locking mechanism portion 13, directly. Accordingly, the pair of right and left rob portions 12 has length different from each other such that the rod portion 12 closer to the driver seat side is shorter and the other rod 12 near to the front passenger seat is longer. Note that the mounting concave portion 14 may be arranged substantially in the middle of a width direction of the lid outer member 6, or other part in the width direction of the lid outer member 6, in one embodiment of the invention.

According to the embodiment of the present invention, the side-locking mechanism 11 described above is arranged in a region 21 of the lid portion 5 in the container body 2 to which knees of the occupant approach in an emergency (hereinafter referred to as "knee-approaching region" 21). In particular, as shown in FIG. 2, the side-locking mechanism 11 is disposed in a region of a knee-contacting portion 22 in the knee-approaching region 21 where the knees of an adult occupant (male for example in the present embodiment) having an average physique are most likely to contact directly thereto.

Here, it is to be noted that an upper edge of a lid portion in an ordinary case is located relatively higher than the located region of the upper edge of the lid portion 5 of the present embodiment. Accordingly, an installed region of a side-locking mechanism in the ordinary case hardly coincides with the location of the knee-approaching region 21 or the knee-contacting portion 22.

Figure 6:
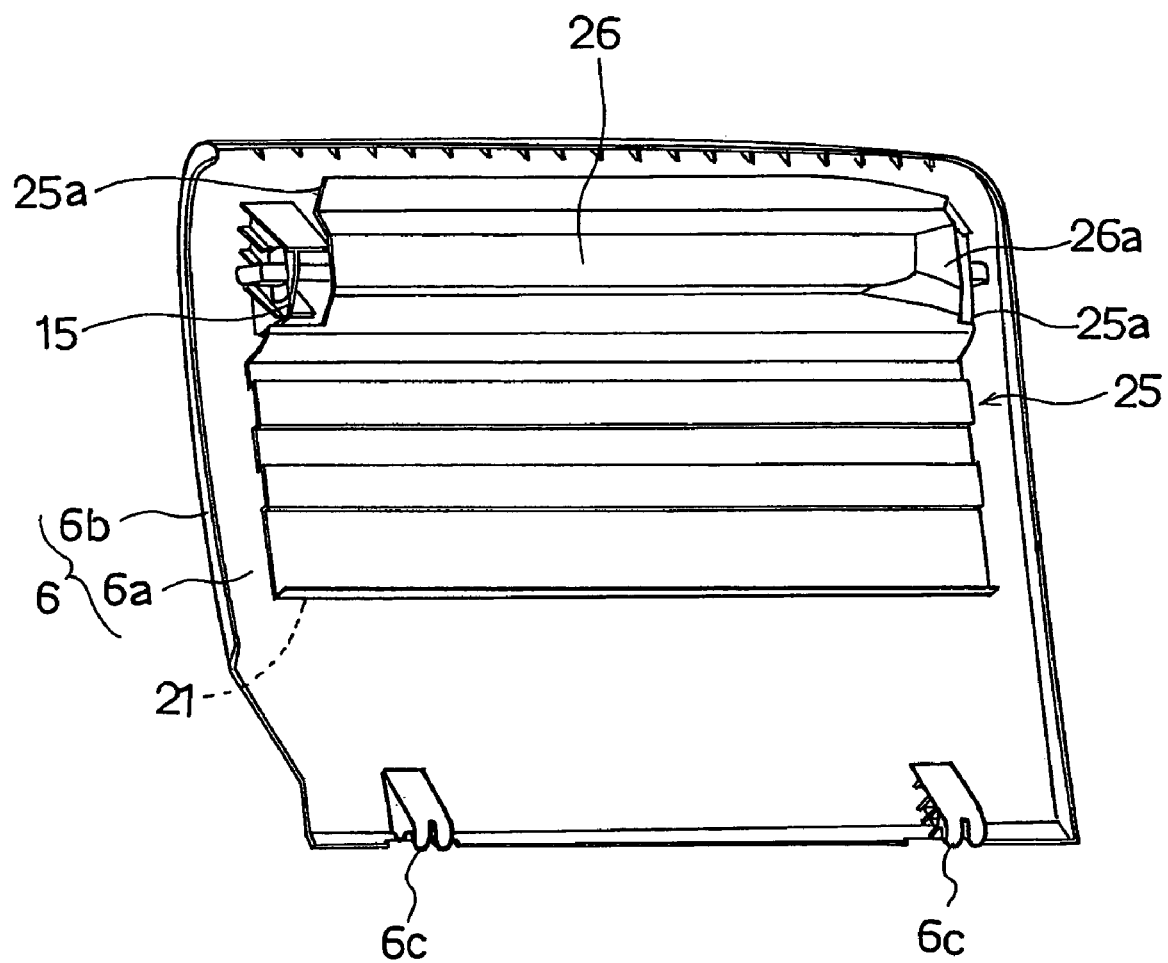
FIG. 6 is a perspective view showing the lid outer member after the energy absorbing knee protector is mounted thereto, seen from the back surface of the lid outer member.

Referring to FIG. 6, an energy absorbing knee protector 25 (first knee protector) is arranged on the lid outer member 6 in such a manner as to substantially cover the knee-approaching region 21 of the lid portion 5, in order to protect the occupant's knees in the emergency. The energy absorbing knee protector 25 is preferably attached substantially along the back surface of the lid outer member 6 after the side-locking mechanism 11 is mounted to the lid outer member 6.

The energy absorbing knee protector 25 comprises a material such as metal, alloy, plastic or the like which receives energy (force) applied from the knees of the occupant (hereinafter referred to as knee input energy) and optimally absorbs the energy, and has a function significantly different from that of normal reinforcement steel plates in terms of specifications and performance. In the present embodiment, the energy absorbing knee protector 25 is structured by a piece of steel plate or sheet.

The energy absorbing knee protector 25 has a bent or curved shape such that contradictory requirements of a function to receive the knee-input energy without deformation and a function to absorb the knee-input energy by the deformation are both satisfied by the single piece of metal plate or sheet. In the present embodiment, the energy absorbing knee protector 25 includes a bent shape in which a plurality of beads each extending substantially in the vehicle-width direction and having a substantially rectangular cross-section of a predetermined depth and width size is arranged, for example.

The energy absorbing knee protector 25 also includes a notch portion 25a in a region corresponding to the rod retaining portion 15 so as to avoid interference with the rod retaining portion 15. In one embodiment, the notch portion 25a may be provided in a region corresponding to the mounting concave portion 14 as well, in order to avoid the interference with the rod retaining portion 15 together with the mounting concave portion 14.

As shown in FIG. 3, according to the present embodiment, the energy absorbing knee protector 25 is mounted to the back surface of the lid outer member 6 by fixing upper and lower edges of the energy absorbing knee protector 25 to the back surface of the lid outer member 6 with a screw 27. Alternatively, the upper and/or lower edge or other part of the energy absorbing knee protector 25 may be fixed to the back surface of the lid outer member 6 by welding or other suitable means.

Additionally, a clearance (relief) concave portion 26 (first concave portion) having a substantially uniform cross-section, and which extends substantially in the vehicle-width direction and detours the side-locking mechanism 11 is formed in the energy absorbing knee protector 25 on a region of the energy absorbing knee protector 25 corresponding to the side-locking mechanism 11. In other words, the clearance concave portion 26 is formed to divert toward a side of the lid inner member 7 to the back surface side thereof. The clearance concave portion 26 is formed in such a cross-sectional shape that the mounting concave portion 14 which projects toward the back surface side most in the side-locking mechanism 11 and the rod portion 12 nearer to the driver seat side are possible to be contained therein. In the present embodiment, the clearance concave portion 26 is formed by bending the energy absorbing knee protector 25.

Figure 10:
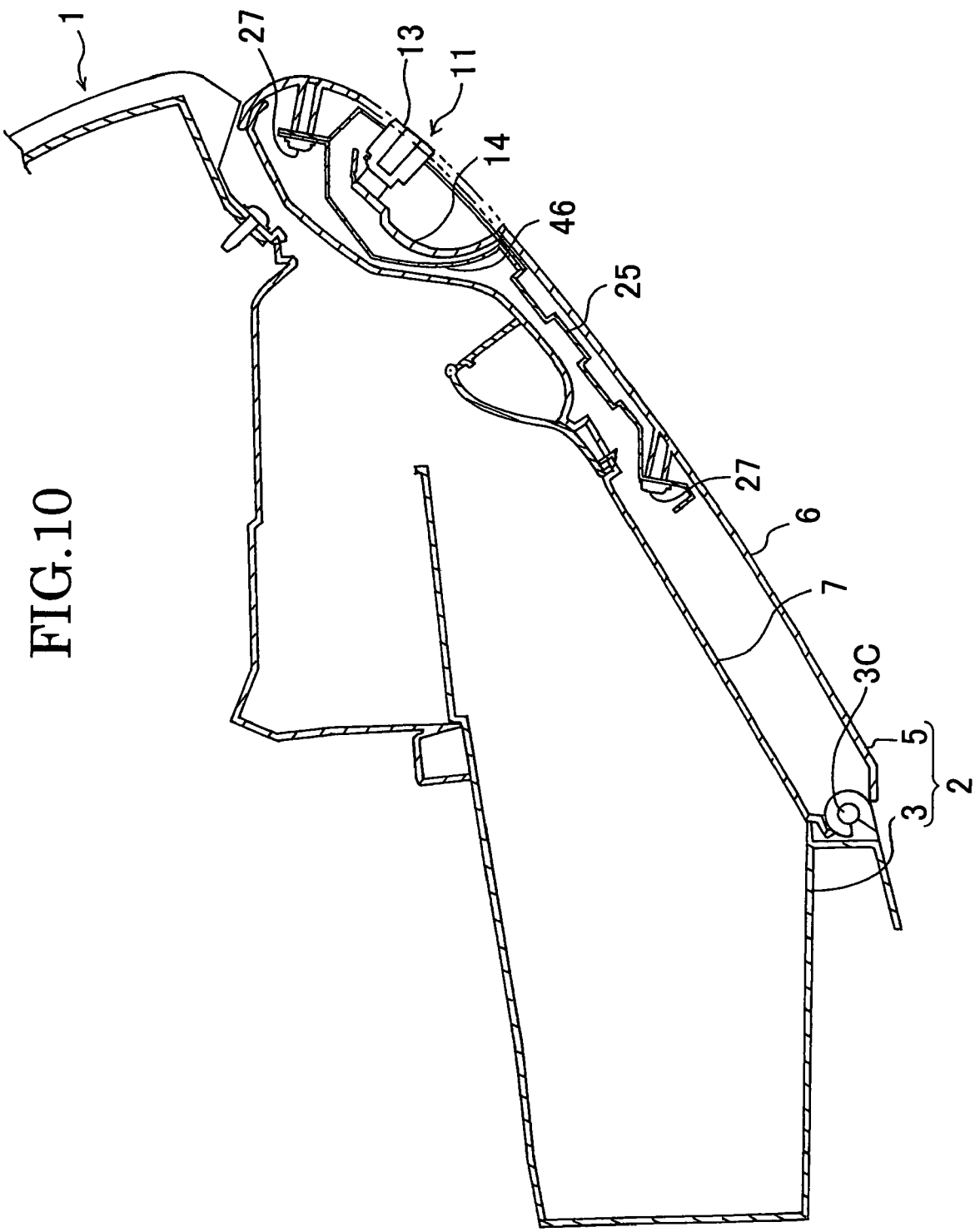
FIG. 10 is a vertical sectional view showing a lid portion according to other embodiment of the invention.

According to other embodiment, referring to FIG. 10, a closed section member 46 (first concave portion) having a substantially uniform cross-section, and which extends substantially in the vehicle-width direction and surrounds the side-locking mechanism 11 is attached to or mounted on the energy absorbing knee protector 25 on the region of the energy absorbing knee protector 25 corresponding to the side-locking mechanism 11, instead of forming the clearance concave portion 26 on the energy absorbing knee protector 25. The closed section member 46 is structured by a piece of metal plate or sheet such as a steel plate or sheet which is discrete relative to the energy absorbing knee protector 25. The closed section member 46 also has such a cross-sectional shape that the mounting concave portion 14 which projects most toward the back surface side in the side-locking mechanism 11 and the rod portion 12 nearer to the driver seat side are possible to be contained therein.

The closed section member 46 is for example fixed to the energy absorbing knee protector 25 by welding upper and lower edges of the closed section member 46 to a back surface of the energy absorbing knee protector 25. In other words, the upper and/or lower edge or other part of the closed section member 46 is welded to a surface of the energy absorbing knee protector 25 which faces toward a side of the lid inner member 7. In this embodiment, the closed section member 46 is welded by utilizing a spot welding, and the upper edge of the closed section member 46 is screwed to the back surface of the lid outer member 6 together with the energy absorbing knee protector 25 although it is not limited thereto.

Figure 7:
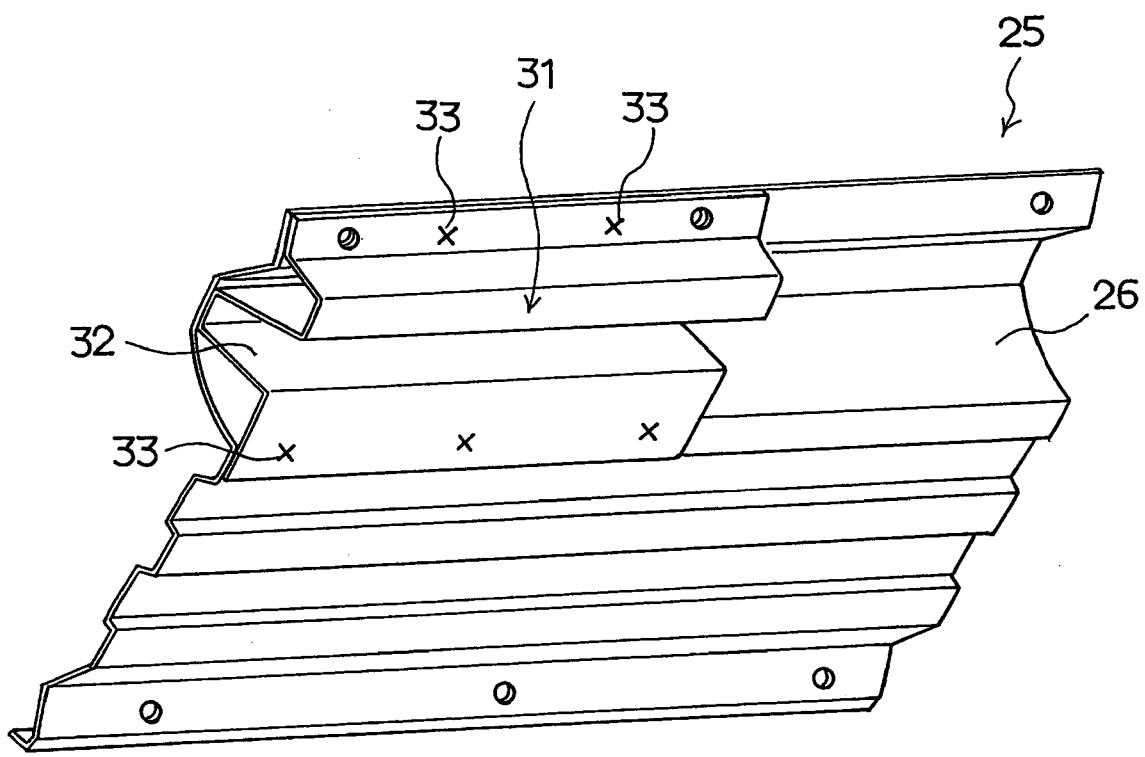
FIG. 7 is a perspective view showing the lid outer member after an auxiliary knee protector is mounted thereto, seen from the back surface of the lid outer member.

Referring to FIG. 7, an region corresponding to the rod portion 12 in the clearance concave portion 26 or the closed section member 46 is provided with an auxiliary knee protector 31 (second knee protector) extending substantially along the back surface of the lid outer member 6. In other words, the auxiliary knee protector 31 is provided in the region in the clearance concave portion 26 or the closed section member 46 other than a region where the mounting concave portion 14 is located.

The auxiliary knee protector 31 also comprises a material such as metal, alloy, plastic or the like which receives the knee-input energy applied from the knees of the occupant and optimally absorbs the energy, and has a function significantly different from that of normal reinforcement steel plates in terms of specifications and performance, as similar to the energy absorbing knee protector 25. In the present embodiment, the auxiliary knee protector 31 is structured by a piece of steel plate or sheet.

The auxiliary knee protector 31 includes a bent or curved shape such that contradictory requirements of the function to receive the knee-input energy without deformation and the function to absorb the knee-input energy by the deformation are both satisfied by the single piece of metal plate or sheet.

In addition, the auxiliary knee protector 31 is formed with a small concave portion 32 (second concave portion), which has a substantially uniform cross-section, extends in the vehicle-width direction and detours the rod portion 12. In other words, the small concave portion 32 of the auxiliary knee protector 31 is formed to divert toward a side of the lid inner member 7 to the back surface side thereof.

In the present embodiment, the small concave portion 32 is formed by bending the auxiliary knee protector 31. In other embodiment, instead of forming the small concave portion 32 on the auxiliary knee protector, a discrete piece of metal member (second concave portion) having a substantially uniform cross-section, and which extends substantially in the vehicle-width direction and detours the rod portion 12 may be attached to or mounted on the auxiliary knee protector 31 by welding, a screw or other appropriate means.

In the small concave portion 32 or the discrete piece of metal member, an inner (bottom) surface portion thereof contacts or substantially contacts with an inner (bottom) surface portion of the clearance concave portion 26 or the closed section member 46, in order to exert a synergistic effect to generate high reaction force.

The auxiliary knee protector 31 is fixed to the energy absorbing knee protector 25 by, in the present embodiment, welding upper and lower edges of the auxiliary knee protector 31 to the surface of the energy absorbing knee protector 25 which faces the lid outer member 6 side (welding point 33 as shown in FIG. 7). In the present embodiment, auxiliary knee protector 31 is fixed to the energy absorbing knee protector 25 by spot welding although it is not limited thereto.

The welding points 33 located on the upper and lower edges of the auxiliary knee protector 31 are preferably arranged for example in a zigzag (staggered) intermittent pattern so as to obtain high strength with few count of welding although any pattern of welding points 33 can be employed as long as the high strength is obtained. Furthermore, in the present embodiment, the upper edge of the auxiliary knee protector 31 is partially screwed to the back surface of the lid outer member 6 together with the energy absorbing knee protector 25.

Here, the auxiliary knee protector 31 can be arranged to each of the right and left rod portions 12 if both of the right and left rod portions 12 have enough length. However, as shown in FIG. 5, in a case, as in the present embodiment, that the rod portion 12 on the driver seat side is short due to the disposition of the locking mechanism portion 13 in which the locking mechanism portion 13 is arranged nearer to the driver seat side and that the auxiliary knee protector 31 cannot be attached to the driver seat side rod portion 12, an uneven cross-section portion 26a may be alternatively formed or mounted, to a limited extent, on the region of the clearance concave portion 26 or the closed section member 46 corresponding to the driver seat side rod portion 12.

Now, operation of the embodiment described above will be explained below.

Taking of an object in and out of the container device 2 is possible by opening and closing the lid portion 5 relative to the container body 3 of the container device 2. The opening and closing of the lid portion 5 is performed through the side-locking mechanism 11 which has advantage in expansion of the storage capacity as compared with the ordinary center-locking mechanism. The side-locking mechanism 11 is unlocked by manipulating the operating lever portion of the locking mechanism portion 13 by the hands of the occupant to retire the rod portions 12 inwardly in the vehicle width direction, and is locked by releasing the operating lever portion to protrude the rod portions 12 outwardly in the vehicle width direction.

When the knees of the occupant approach or enter into the lid portion 5 in the emergency, the energy absorbing knee protector 25 provided substantially along the back surface of the lid outer member 6 in such a manner as to substantially cover the knee-approaching region 21 receives the knee-input energy applied from the knees of the occupant without deformation, and thereafter optimally absorbs the knee-input energy by the deformation. Thereby, the knees of the occupant are protected from damage.

Particularly, according to the present embodiment, the upper edge of the lid portion 5 is disposed relatively lower than that of the lid portion in the ordinary case. Hence the side-locking mechanism 11 overlaps with the location of the knee-approaching region 21 or the knee-contacting portion 22 in the present embodiment.

Therefore, the clearance concave portion 26 having the substantially uniform cross-section, and which extends substantially in the vehicle-width direction and detours the side-locking mechanism 11 is formed in the energy absorbing knee protector 25 on the region of the energy absorbing knee protector 25 corresponding to the side-locking mechanism 11. Also, in other embodiment, the closed section member 46 having the substantially uniform cross-section, and which extends substantially in the vehicle-width direction and surrounds the side-locking mechanism 11 is attached to the energy absorbing knee protector 25 on the region of the energy absorbing knee protector 25 corresponding to the side-locking mechanism 11, instead of forming the clearance concave portion 26 on the energy absorbing knee protector 25.

Hence, according to the embodiment of the present invention, it is possible to mount the energy absorbing knee protector 25 even when the side-locking mechanism 11 is employed.

In addition, it is also possible to increase the strength and rigidity of the energy absorbing knee protector 25 without incurring increase in weight, and to ensure desired absorption performance of the energy. Therefore, opening speed of the lid portion 5 and force required to close the lid portion 5 can be lowered and reduced, and thereby it is possible to increase an operating feeling.

In this case, the cross-section of the clearance concave portion 26 or the closed section member 46 is substantially uniform in the vehicle-width direction, and thereby the clearance concave portion 26 or the closed section member 46 deforms substantially even. It is therefore possible to allow designing to be performed easily and to surely exhibit the expected absorption performance of the energy. Here, on the contrary, the clearance concave portion 26 or the closed section member 46 may deform uneven if the clearance concave portion 26 or the closed section member 46 has an uneven cross-section, and accordingly it becomes difficult to perform the designing and to ensure the desired energy absorption performance.

In addition, note that the area of the clearance concave portion 26 or the closed section member 46 in the energy absorbing knee protector 25 is distant away from the back surface of the lid outer member 6, i.e. a distance of transferring of the energy is thus longer and there may be a delay in the energy absorption in that area.

However, according to the embodiment of the present invention, the auxiliary knee protector 31 which extends substantially along the back surface of the lid outer member 6 is separately provided in the region corresponding to the rod portion 12 in the clearance concave portion 26 or the closed section member 46. Therefore, it is possible to reduce such a distance of transferring of the energy and to avoid the delay in the energy absorption.

In particular, ensuring of the energy absorption performance is even more difficult and severe when the side-locking mechanism 11 is disposed in the knee-contacting portion 22 within the knee-approaching region 21 where the knees of the adult occupant having the average physique are most likely to contact directly thereto. In the embodiment of the present invention, however, the double structure of the energy absorbing knee protector 25 and the auxiliary knee protector 31 is provided, and the inner (bottom) surface portion of the small concave portion 32 or the discrete piece of metal member and the inner (bottom) surface portion of the clearance concave portion 26 or the closed section member 46 are contacted or substantially contacted, so as to increase the strength and rigidity. Therefore, it is possible to obtain the high reaction force and to ensure the optimum energy absorption performance.

Here, the cross-section of small concave portion 32 or the discrete piece of metal member is also substantially uniform in the vehicle-width direction, and hence the small concave portion 32 or the discrete piece of metal member deforms substantially even. It is therefore possible to allow designing to be performed easily and to surely exhibit the expected energy absorption performance. On the other hand, the small concave portion 32 or the discrete piece of metal member may deform uneven if the small concave portion 32 or the discrete piece of metal member has an uneven cross-section, and accordingly it becomes difficult to perform the designing and to ensure the desired energy absorption performance.

In the present embodiment, the energy absorbing knee protector 25 and the auxiliary knee protector 31 are separate structures. Therefore, it is possible to simplify and facilitate those designs, and also to reduce a size of the region of the locking mechanism portion 13 in the clearance concave portion 26 or the closed section member 46 which cannot be covered by the auxiliary knee protector 31 to the minimum extent.

Moreover, in the side-locking mechanism 11 according to the embodiment of the invention, the locking mechanism portion 13 and the rod portions 12 are structured detachable and connectable through the fitting portion 51. Hence, it is possible to insert the rod portions 12 from sideways of the clearance concave portion 26 or the closed section member 46 to couple the rod portions 12 with the locking mechanism portion 13 even when the energy absorbing knee protector 25 and the auxiliary knee protector 31 or the closed section member 46 are previously mounted.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An absorption structure for absorbing energy applied from knees of an occupant, comprising:
    a container provided in an instrument panel and having an opening;
    a lid attached to the opening of the container and having a lid outer member and a lid inner member;
    a side-locking mechanism provided on the lid outer member and having a locking member and a locking mechanism, the locking member extending from the locking mechanism toward at least one side of a vehicle substantially in a direction of width of the vehicle, and the locking mechanism being configured to enter a leading edge of the locking member into at least one side of the lid and to move the leading edge of the locking member out of the at least one side of the lid;
    a first knee protector provided substantially along a back surface of the lid outer member;
    a first concave portion formed on a region of the first knee protector corresponding to a location of the side-locking mechanism substantially in the vehicle width direction and detouring the side-locking mechanism;
    a second knee protector provided substantially along the back surface of the lid outer member in a region within the first concave portion corresponding to the locking member; and
    a second concave portion formed on the second knee protector substantially in the vehicle width direction and detouring the locking member.

2. The absorption structure according to claim 1, wherein the locking member is detachably fitable to the locking mechanism by pushing the locking member into the locking mechanism in a direction of extension of the locking member.

3. The absorption structure according to claim 1, wherein the first knee protector includes a plurality of beads each extending substantially in the vehicle-width direction and having a substantially rectangular cross-section of a predetermined depth and width size.

4. The absorption structure according to claim 1, wherein a bottom surface of the second concave portion substantially contacts with a bottom surface of the first concave portion.

5. The absorption structure according to claim 1, wherein the first knee protector is mounted on the back surface of the lid outer member by fixing upper and lower edges of the first knee protector to the back surface of the lid outer member with a screw or by welding.

6. The absorption structure according to claim 1, wherein the first knee protector includes a notch in a region corresponding to the at least one side of the lid so as to avoid interference of the first knee protector with the at least one side of the lid.

7. The absorption structure according to claim 1, wherein the side-locking mechanism is disposed in a region of a knee-contacting part on the lid outer member where knees of an adult occupant having an average physique are most likely to contact the region of the knee-contacting part, directly.

8. An absorption structure for absorbing energy applied from knees of an occupant, comprising:
   a container provided in an instrument panel and having an opening;
   a lid attached to the opening of the container and having a lid outer member and a lid inner member;
   a side-locking mechanism provided on the lid outer member and having a locking member and a locking mechanism, the locking member extending from the locking mechanism toward at least one side of a vehicle substantially in a direction of width of the vehicle, and the locking mechanism being configured to enter a leading edge of the locking member into at least one side of the lid and to move the leading edge of the locking member out of the at least one side of the lid;
   a first knee protector provided substantially along a back surface of the lid outer member; and
   a first concave portion mounted on a region of the first knee protector corresponding to a location of the side-locking mechanism substantially in the vehicle width direction and surrounding the side-locking mechanism,
   wherein the locking member is detachably fitable to the locking mechanism by pushing the locking member into the locking mechanism in a direction of extension of the locking member.

9. The absorption structure according to claim 8, wherein the first knee protector includes a plurality of beads each extending substantially in the vehicle-width direction and having a substantially rectangular cross-section of a predetermined depth and width size.

10. The absorption structure according to claim 8, further comprising a second knee protector provided substantially along the back surface of the lid outer member in a region within the first concave portion corresponding to the locking member; and a second concave portion formed on the second knee protector substantially in the vehicle width direction and detouring the locking member, wherein a bottom surface of the second concave portion substantially contacts with a bottom surface of the first concave portion.

11. The absorption structure according to claim 8, wherein the first knee protector is mounted on the back surface of the lid outer member by fixing upper and lower edges of the first knee protector to the back surface of the lid outer member with a screw or by welding.

12. The absorption structure according to claim 8, wherein the first knee protector includes a notch in a region corresponding to the at least one side of the lid so as to avoid interference of the first knee protector with the at least one side of the lid.

13. The absorption structure according to claim 8, wherein the side-locking mechanism is disposed in a region of a knee-contacting part on the lid outer member where knees of an adult occupant having an average physique are most likely to contact the region of the knee-contacting part, directly.

14. An absorption structure for absorbing energy applied from knees of an occupant, comprising:
   a container provided in an instrument panel and having an opening;
   a lid attached to the opening of the container and having a lid outer member and a lid inner member;
   a side-locking mechanism provided on the lid outer member and having a locking member and a locking mechanism, the locking member extending from the locking mechanism toward at least one side of a vehicle substantially in a direction of width of the vehicle, and the locking mechanism being configured to enter a leading edge of the locking member into at least one side of the lid and to move the leading edge of the locking member out of the at least one side of the lid;
   a first knee protector provided substantially along a back surface of the lid outer member;
   a first concave portion mounted on a region of the first knee protector corresponding to a location of the side-locking mechanism substantially in the vehicle width direction and surrounding the side-locking mechanism, the first knee protector and the first concave portion being discrete members;
   a second knee protector provided substantially along the back surface of the lid outer member in a region within the first concave portion corresponding to the locking member; and
   a second concave portion formed on the second knee protector substantially in the vehicle width direction and detouring the locking member.

15. The absorption structure according to claim 14, wherein the locking member is detachably fitable to the locking mechanism by pushing the locking member into the locking mechanism in a direction of extension of the locking member.

16. The absorption structure according to claim 14, wherein the first knee protector includes a plurality of beads each extending substantially in the vehicle-width direction and having a substantially rectangular cross-section of a predetermined depth and width size.

17. The absorption structure according to claim 14, wherein a bottom surface of the second concave portion substantially contacts with a bottom surface of the first concave portion.

18. The absorption structure according to claim 14, wherein the first knee protector is mounted on the back surface of the lid outer member by fixing upper and lower edges of the first knee protector to the back surface of the lid outer member with a screw or by welding.

19. The absorption structure according to claim 14, wherein the first knee protector includes a notch in a region corresponding to the at least one side of the lid so as to avoid interference of the first knee protector with the at least one side of the lid.

20. The absorption structure according to claim 14, wherein the side-locking mechanism is disposed in a region of a knee-contacting part on the lid outer member where knees of an adult occupant having an average physique are most likely to contact to the region of the knee-contacting part, directly.

* * * * *